United States Patent [19]

Ueda et al.

[11] Patent Number: 4,572,082

[45] Date of Patent: Feb. 25, 1986

[54] THERMAL DECOMPOSITION FURNACE OF WASTE TIRES

[75] Inventors: Yoshihiko Ueda, Chiba; Ikuo Saito, Tokyo; Kazumasa Sakae, Yachiyo; Tetuo Oogiri, Tokyo, all of Japan

[73] Assignee: Onoda Cement Co., Ltd., Japan

[21] Appl. No.: 740,534

[22] Filed: Jun. 3, 1985

Related U.S. Application Data

[63] Continuation of Ser. No. 689,461, Jan. 7, 1985, which is a continuation of Ser. No. 557,332, Dec. 2, 1983, abandoned.

[51] Int. Cl.[4] .............................................. F23G 5/00
[52] U.S. Cl. ................................. 110/245; 110/118; 110/256; 110/264; 110/266; 122/4 D; 431/173
[58] Field of Search .............. 110/118, 235, 244, 245, 110/256, 257, 258, 264, 265, 266, 346; 122/4 D; 431/7, 170, 173

[56] References Cited

U.S. PATENT DOCUMENTS

| 2,483,728 | 10/1949 | Glaeser | 110/244 |
| 3,431,892 | 3/1969 | Crodel | 110/264 |
| 3,946,680 | 3/1976 | Caman | 110/237 |
| 4,203,804 | 5/1980 | Janning et al. | 110/245 |
| 4,372,228 | 2/1983 | Korenberg | 431/7 |
| 4,452,154 | 6/1984 | Kono et al. | 110/256 |

FOREIGN PATENT DOCUMENTS

| 112923 | 9/1980 | Japan | 110/235 |
| 23625 | 3/1981 | Japan | 110/244 |
| 26316 | 2/1982 | Japan | 110/118 |

Primary Examiner—Edward G. Favors
Assistant Examiner—Steven E. Warner
Attorney, Agent, or Firm—Price, Heneveld, Huizenga & Cooper

[57] ABSTRACT

A thermal decomposition furnace in which waste tires having original shape, not broken up, can be laid horizontally and be thermally decomposed. The furnace is constructed by providing a feeder above, forming downward a fluidized bed-forming section having inlets for air, forming beneath a sealing bed-forming section of right cylindrical shape having a diameter smaller than that of fluidized bed-forming section, and installing a conveyor below said sealing bed-forming section. At the lower end of sealing bed-forming section, an oblique opening is formed so as to keep an progressively increasing clearance to the conveyor in the direction of advance of conveyor.

8 Claims, 5 Drawing Figures

THERMAL DECOMPOSITION FURNACE OF WASTE TIRES

This is a continuation of application Ser. No. 689,461, filed Jan. 7, 1985, pending, which is a continuation of application Ser. No. 557,332, filed Dec. 2, 1983, now abandoned.

This invention relates to thermal decomposition furnaces of waste tires for utilizing waste tires of automobile etc. as fuel for cement kiln, combustion chamber of bioler, dryer or broadly general uses.

In the prior art, verious types of thermal decomposition furnace for this purpose has been proposed, but none of them is satisfactory. In a prior method, as an example, wherein a deep fluidized bed furnace is employed for thermally decomposing waste tires, incombustible steel cords left cannot be discharged during continuous operation. Thus, one must take the trouble to break up waste tires into scraps of nearly equal size at the beginning.

It is intended by this invention to resolve these problems of the prior art. It is the principal object of this invention to provide a thermal decomposition furnace of waste tires which can thermally decompose waste tires as an original shape without breaking up waste tires. It is another object of the present invention to provide a thermal decomposition furnace of waste tires in which a continuous operation, not an intermittent operation, can be performed. A further object of this invention is to porvide a thermal decomposition furnace of waste tires wherein the entire amount of heat in embers can be utilized whithout wasting. A specific object of the present invention is to provide a thermal decomposition furnace of waste tires in which no difficult procedures, such as removal of embers or seal cords from the high temperature interior of the furnace, are necessary.

It has been found by this invention that the above objects can be most suitably accomplished by providing a thermal decomposition furnace of waste tires which is characterized by comprising a body of thermal decomposition furnace adapted to receive waste tires having original shape, the inner diameter of said body being larger than the outer diameter of waste tire; a feeder adapted to charge a waste tire having original shape into said body from above; a fluidized bed-forming section formed in the lower part of said body, said fluidized bed-forming section being provided with inlets in the side wall; air pipes connected to said inlets and communicated with a blower; a sealing bed-forming section arranged beneath said fluidized bed-forming section; a conveyor disposed below said sealing bed-forming section; and an opening formed at the lower end of said sealing bed-forming section, the cut of said opening being so slanted that the distance from the upper surface of conveyor progressively increases in the direction of advancement of the conveyor.

Other objects and aspects of this invention will be understood from the following description taken in conjunction with the accompanying drawings wherein.

Figure 1:
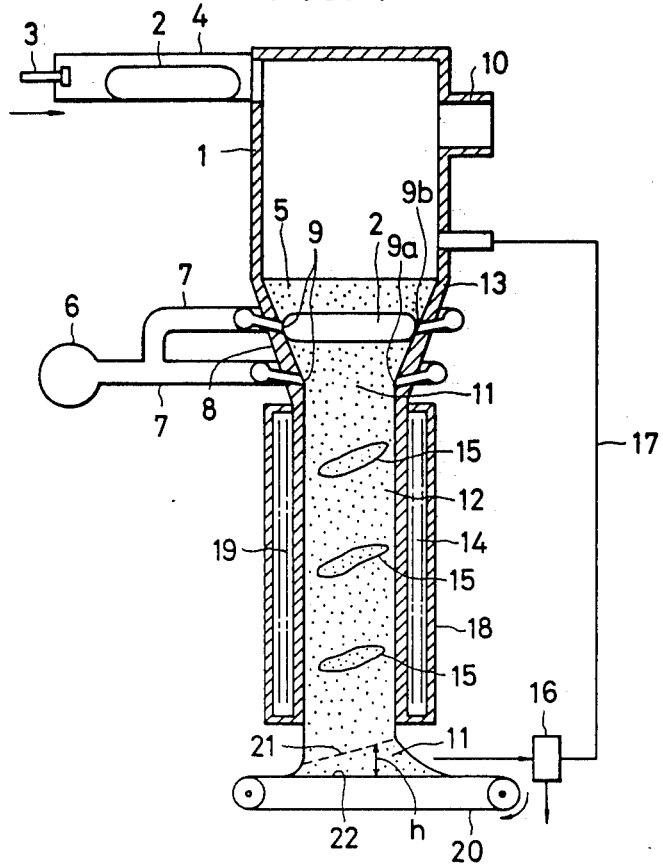
FIG. 1 is a sectional view which represents a scheme of one preferred embodiment of thermal decomposition furnace of waste tires according to this invention.

Referring now to the drawing, there is illustrated in FIG. 1, a body 1 of the thermal decomposition furnace. A waste tire 2 is passed through a charging chamber 4 by means of a feeder 3 and is thrown into the body 1 to be decomposed by heat in a fluidized bed 5. It is to be noted that, to commence operating the thermal decomposition furnace, the medium which will constitute the fluidized bed 5, such as silica sand and cement clinker, must be preliminarily heated to about 600° C. or above. For the purpose of heating the medium, some waste tires 2 are preliminarily stacked in the fluidized bed 5 and are heated to burn. Then, the furnace is ready for operating.

The air for fluidizing the above-mentioned medium is fed from inlets 9 formed in the side wall 8 of body 1 via air pipes 7 by means of a blower 6. The gas which has been generated by thermal decomposition of waste tires 2 passes a duct 10 from the upper part of the body 1 and is blown into a combustion furnace not shown. This generated gas burns well in a combustion furnace because a large amount of CO, $H_2$, $CH_4$, $C_mH_n$ etc. are contained.

The thermal decomposition furnace is so constructed that the upward gas velocity in the space above the fluidized bed, when converted to it under normal condition, amounts to a value $v = 0.1 - 0.5$ $Nm^3$/sec..

Figure 2:
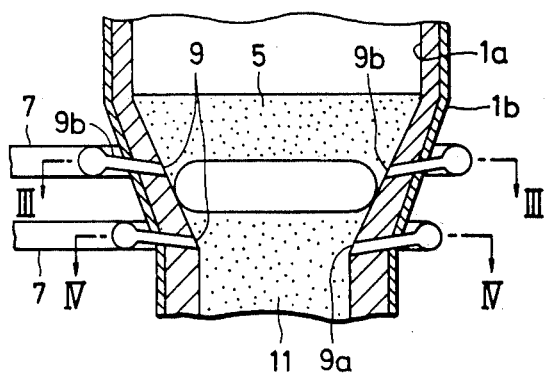
FIG. 2 shows the details, on enlarged scale, of an essential part of the furnace in FIG. 1.
Figure 3:
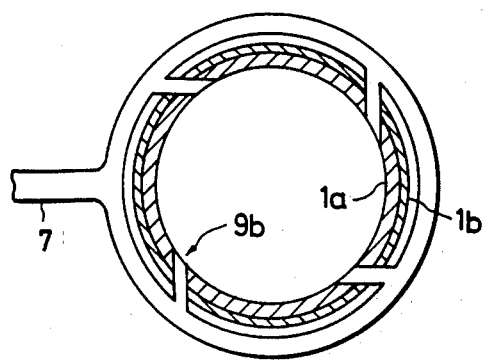
FIG. 3 shows a section taken along the line III—III of FIG. 2.
Figure 4:
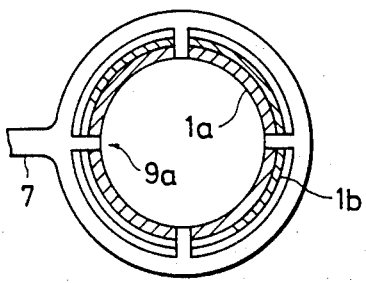
FIG. 4 shows a section taken along the line IV—IV of FIG. 2.

The generated gas includes carbon and the maximum diameter of carbon particle is ca. 1 mm. Thus, in the case of said combustion furnace being that of boiler etc., it is desirable that carbon is separated by means of a gas-solids separator, such as cyclone, and is returned to the fluidized bed 5 in the body 1 by way of a return line not shown to be decomposed thermally. The above-mentioned charging chamber 4 is provided with multiple dampers, not shown in the drawings, to form a sure seal. Accordingly, this apparatus allows charging of waste tires 2 during continuous operation. The above-mentioned inlets 9 of the air pipes 7 are arranged at two different heights as shown by 9a and 9b in FIGS. 1 and 2. In addition, lower inlets 9a are formed in the directions of radius of body 1 as shown by FIG. 4 and upper inlets 9b are formed in tangential directions as shown by FIG. 3. The lower inlets 9a feed air in an amount Ao ($Nm^3$/min.) required to fluidize the bed 5 and the upper inlets 9b feed air in an amount Aa ($Nm^3$/min.) required for gasification of waste tires. By regulating this air amount Aa with the use of a valve not shown, the throughput of waste tires is controlled. In order to maintain the normal operation of the furnace, the temperature of fluidized bed 5, as thermal decomposition temperature, is kept at a suitable point in the range of 600°–800° C. partly by adjusting the air amount through upper inlets 9b. As hereinafter stated, the aforementioned medium 11 is circulated and replaced by means of a return line arranged outside the body 1 according to this invention. The temperature of fluidized bed 5 is also controlled partly by regulating the amount of medium to be replaced. In addition, it is preferred that said inlets 5a and 5b are inclined downward toward the body 1, making an angle of 5° to 20° with the horizontal. In FIGS. 2, 3 and 4, reference numerals 1a and 1b indicate a refractory material and a casing, respectively. As shown in the drawings, a fluidized bed-forming section 13 is formed by slanted side wall 8 so as to have a smaller diameter at a lower position. By virture of this structure, the formed fluidized bed slides on the slanted surface and the fluidization is smoothly performed to obtain a uniform fluidized bed.

On the other hand, a sealing bed 12 is formed by medium 11 in the part below said inlets 9a. The sealing mechanism by this sealing bed 12 is due to packing of medium 11. Sealing is satisfactory when the air for forming the fluidized bed cannot blow through the sealing bed. Thus, it is preferred that the depth of sealing bed is made to be 2 to 5 times the depth of the fluidized bed 5. The size of said medium is of 0.1 to 5 mm$\phi$, preferably 0.2 to 1.2 mm$\phi$. The material of the medium should have heat resistance to about 1500° C. Employable materials are exemplified by refractories, such as cement clinker and silica sand. Reference numerals 13 and 14 indicate a fluidized bed-forming section and a sealing bed-forming section, respectively. The ratio of the vertical length between both forming sections is the same as the ratio of depth between the fluidized bed 5 and the sealing bed 12. The level of medium 11 of the fluidized bed 5 is so controlled that, when L denotes the depth of the fluidized bed 5 and D denotes the diameter of bed, the ratio L/D is kept in the range of $\frac{1}{2}$ to 2. To perform a normal operation with maintaining the level in position, charge and discharge amounts of medium 11 are regulated by maintaining the constant differences between a measured pressure at the top of furnace and measured pressures at some points of fluidized bed 5. The replacement of medium 11 in the fluidized bed is performed at the rate by which an amount of about $\frac{1}{2}$ to 3 times the volume of fluidized bed 5 is replaced per hour.

When a waste tire is thermally decomposed and passes through the fluidized bed 5, crude embers enveloping steel cord 15 are agitated and broken up by fluidized medium 5, soon are released from steel cord 15 by heat, are comminuted, and are passed to a combustion furnace along with the generated gas to be utilized for heating in combustion furnace. On the other hand, the above-mentioned steel cord moves downward with medium 11 in the sealing bed 12 as the medium 11 is drawn from the bottom of sealing bed 12. Steel cords are successively expelled to the outside with medium 11.

Then, steel cords 15 are separated from the medium by means of a separator 16, such as magnetic separator and grizzly, and the medium 11 is returned to the interior of the body 1 via a return line 17 arranged to discharge into the body. A water-cooling jacket is provided round the sealing bed-forming section 14 and water 19 within the jacket 18 chills the section. By virtue of this chilling, the medium 11 and the steel cords 15 which have been drawn outside from the bottom of sealing bed 12 are at a lower temperature and the conveyor 20 or other installations for receiving these materials can be prevented from any heat damage. Further, the sealing bed-forming section 14 is constructed as nearly right cylindrical shape. Thus, the steel cord 15 as an original shape, i.e. not broken, can move downward without any trouble. In addition, the inner diameter of body 1 is made to be larger than the outer diameter of waste tire 2, and the inner diameter of sealing bed-forming section is made to be smaller than the outer diameter of waste tire 2. Accordingly, the separation of steel cords 15 from waste tires 12 is relatively secured.

Now, a brief mention will be made of an opening 21 of the aforementioned sealing bed-forming section 14.

Figure 5:
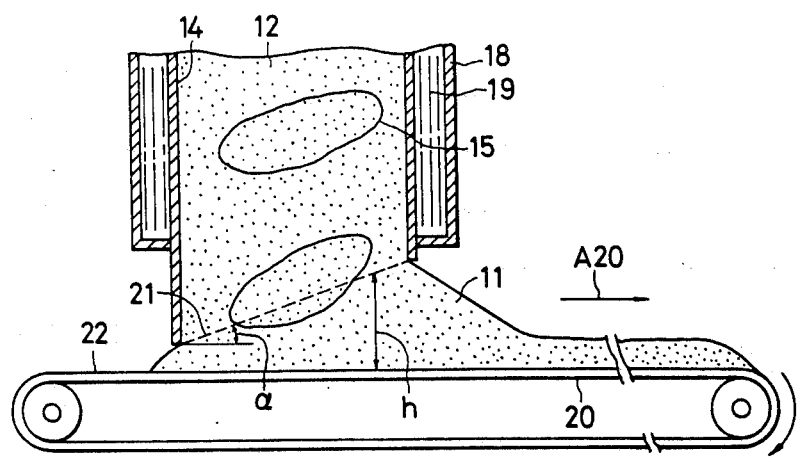
FIG. 5 represents an enlarged sectional view of another essential part of the furnace in FIG. 1.

As can be seen from FIG. 5, the opening 21 is made so as to keep a distance h from the upper surface 22 of conveyor 20. The cut of opening 21 is so slanted that said distance h from the upper surface 20 of conveyor progressively increases as the viewpoint moves in the direction of advancement of the conveyor. Preferably, the angle of inclination $\alpha$ in FIG. 4 takes a vaule of 15 to 30 degrees. When $\alpha = 0$, expelling of steel cord 15 becomes difficult. In contrast, when the cut of opening is formed to have an excessive angle of inclination, sealing is deteriorated.

The conveyor 20 advances in the direction of arrow A20. Thereby, medium 11 including steel cords 15 is drawn outside and the medium is separated from steel cords 15 by a separator 16. The resulting medium 11 is returned to the above-mentioned body 1 via the return line 17. Steel cords 15 are collected.

By virtue of a thermal decomposition furnace being constructed as mentioned above according to the present invention, waste tires having an original shape can be thermally decomposed in continuous operation. The operation proceeds without the dificult procedure that embers and steel cords are raked out from high temperature surroundings of a furnace. Thus, the heat of embers can be entirely utilized.

What is claimed is:

1. A furnace for thermally decomposing waste tires comprising:

an upper bed-forming section having lateral dimensions larger than the outer diameter of a waste tire;

a vertically elongated lower bed-forming section having an open lower end and lateral dimensions smaller than the lateral dimensions of said upper section and smaller than the outer diameter of a waste tire, said lower section being positioned below and in communication with said upper section and forming a tire decomposition chamber;

granular media disposed within said upper and lower sections forming a continuous column of granular media;

means for fluidizing the media within said upper section;

means for withdrawing media from the bottom of said lower section;

means for returning withdrawn media to said upper section; and whereby whole waste tires can be individually fed into said fluidized media in said upper section and thermally decomposed as they move downwardly through said column of granular media.

2. A furnace for thermally decomposing waste tires comprising an upper generally conical combustion chamber having an upper end and a smaller lower end, a lower generally cylindrical combustion chamber below and communicating with said upper chamber, the diameter of the upper end of the upper chamber being greater than that of the tires and the diameter of the lower chamber being less than that of the tires whereby unburnable portions of the tires are compressed as they move through the chambers, a charge of granular noncombustible material filling said lower chamber and partially filling said upper chamber, means for fluidizing the granular material in said upper chamber, means for withdrawing the granular material from the bottom of said lower chamber and for separating any unburned tire residue therefrom and returning the granular material to the top of the upper chamber whereby whole tires placed in the top of the upper chamber will gradually move downwardly through both chambers with the granular material as they are being thermally decomposed.

3. A furnace for thermally decomposing waste tires comprising:

an upper bed-forming section having upper and lower ends;

a vertically elongated lower bed-forming section having an open lower end and lateral dimensions smaller than the lateral dimensions of said upper section, said lower section being positioned below and in communication with said lower end of said upper section and together forming a tire decomposition chamber, the lower end of said upper section being generally conical in shape forming a restricted throat connected to and of the same lateral dimension as said lower section;

granular media disposed within said upper and lower sections forming a continuous column of granular media;

fluidizing means for fluidizing the media within said upper section;

withdrawing and recycling means for withdrawing media from the bottom of said lower section and returning withdrawn media to said upper section, said withdrawing and recycling means including separation means for separating the steel cords of the tires from the withdrawn media, said withdrawing and recycling means further including conveyor means disposed beneath the open end of said lower section to receive media therefrom, the opening at the end of said lower section being upwardly inclined away from the surface of said conveyor means in the direction of advancement of said conveyor means, whereby whole waste tires can be individually fed into said fluidized media in said upper section and thermally decomposed as they are carried downwardly with said column of granular media.

4. A thermal decomposition furnace of waste tires as claimed in claim 3, wherein said lower section is cylindrical.

5. A thermal decomposition furnace of waste tires as claimed in claim 3, wherein said cut of said opening is formed to be inclined at 15° to 30°.

6. The furnace recited in claim 3 wherein the diameter of the tire introduced into the upper chamber is smaller than the diameter of the upper portion of the upper chamber and is greater than the diameter of the lower section.

7. The furnace as recited in claim 3 which further includes a chamber positioned above and in communication with said upper section, and a feeder adapted to charge an uncomminuted waste tire into said upper section through said chamber.

8. A thermal decomposition furnace of waste tires as claimed in claim 7, wherein said inlets of said air conduits are arranged at two different heights in said upper section, lower inlets being oriented toward the center of said upper section, and upper inlets being oriented in tangential directions.

* * * * *